US006917519B2

(12) United States Patent
Coyle et al.

(10) Patent No.: US 6,917,519 B2
(45) Date of Patent: Jul. 12, 2005

(54) SECURED MOUNTING FOR COMPUTER AND PERIPHERALS

(75) Inventors: Michael P. Coyle, Taylor, TX (US); Robert Duane Hrehor, Jr., Round Rock, TX (US); Lisa Sura, Pflugerville, TX (US); Jefferson B. West, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 10/392,556

(22) Filed: Mar. 20, 2003

(65) Prior Publication Data

US 2004/0184229 A1 Sep. 23, 2004

(51) Int. Cl.[7] .................................................. G06F 1/16
(52) U.S. Cl. ....................................... 361/683; 361/724
(58) Field of Search ................................ 361/679, 683, 361/724–727; 312/223.1–223.3

(56) References Cited

U.S. PATENT DOCUMENTS

| 5,926,364 | A | * | 7/1999 | Karidis ........................ 361/681 |
|---|---|---|---|---|
| 6,081,422 | A | | 6/2000 | Ganthier et al. |
| 6,252,766 | B1 | | 6/2001 | Radloff |
| 6,297,954 | B1 | | 10/2001 | Seo |
| 6,424,525 | B1 | | 7/2002 | MacLeod et al. |
| 6,487,089 | B1 | * | 11/2002 | Otis ........................... 361/796 |
| 6,490,155 | B2 | | 12/2002 | Han et al. |
| 2003/0151336 | A1 | * | 8/2003 | Freeman |
| 2003/0217110 | A1 | * | 11/2003 | Weiss |
| 2004/0001320 | A1 | * | 1/2004 | Baar et al. |

* cited by examiner

Primary Examiner—Yean-Hsi Chang
(74) Attorney, Agent, or Firm—Haynes and Boone, LLP

(57) ABSTRACT

A computer chassis includes a plurality of identical slots formed therein. Each slot is provided adjacent a respective one of a plurality of side surfaces of the chassis. An accessory or peripheral is provided with an elongated tongue which extends from the accessory or peripheral for insertion into a selected one of the slots of the chassis. As a result, the accessory or peripheral is mountable to any one of a plurality of side surfaces of the chassis. Furthermore, the inserted tongue is secured in the respective slot by a cover.

34 Claims, 14 Drawing Sheets

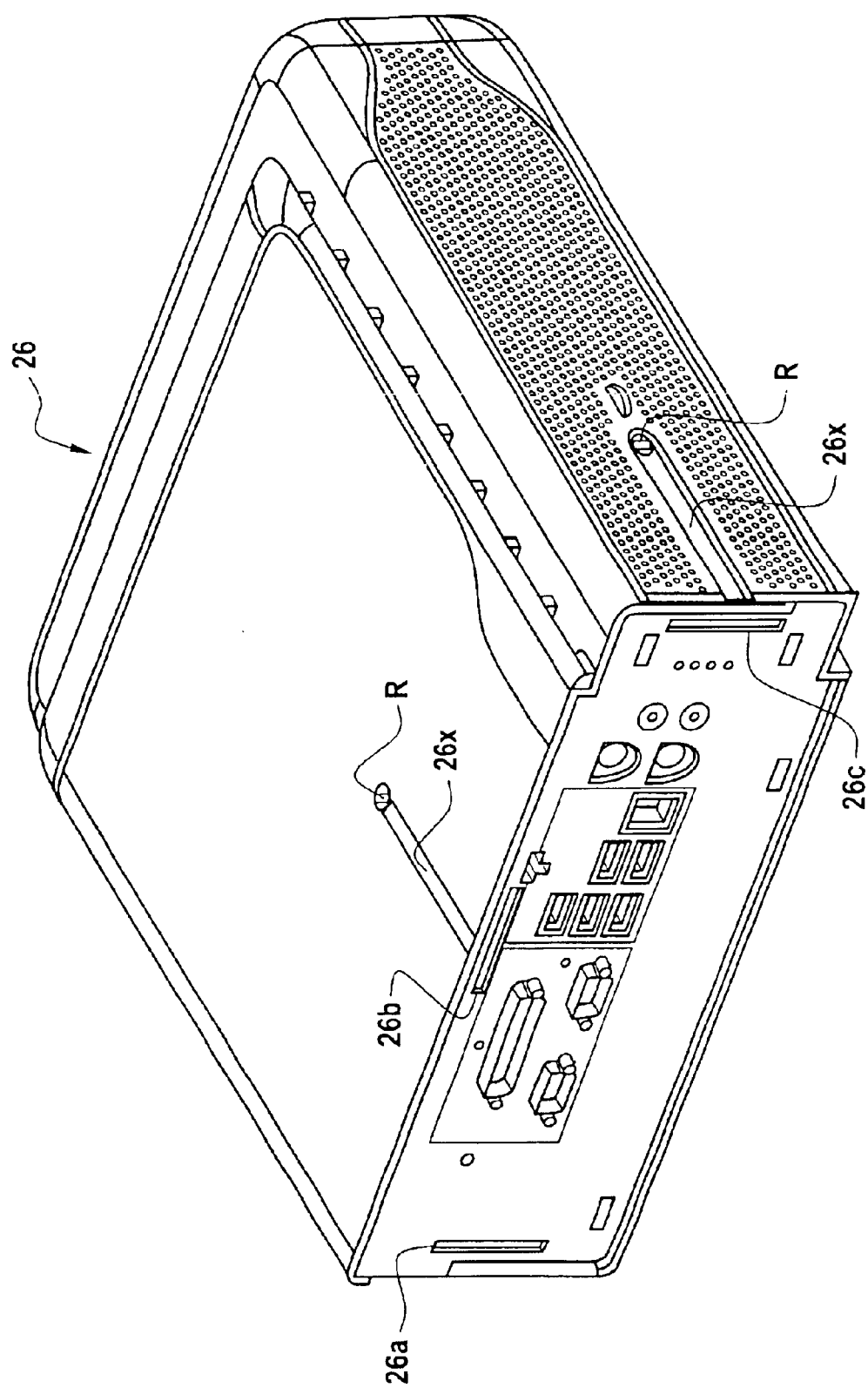

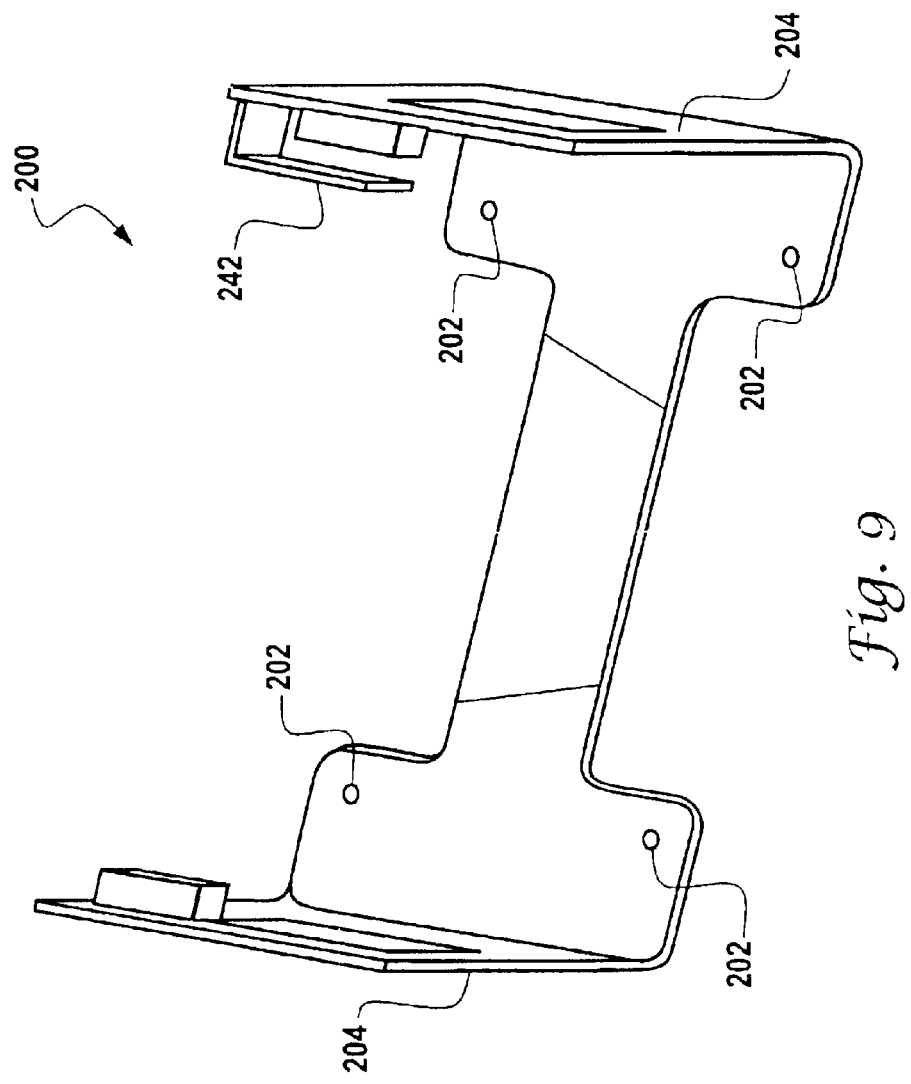
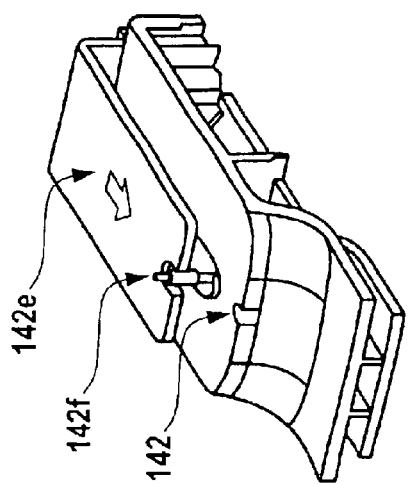
Fig. 9
Fig. 8

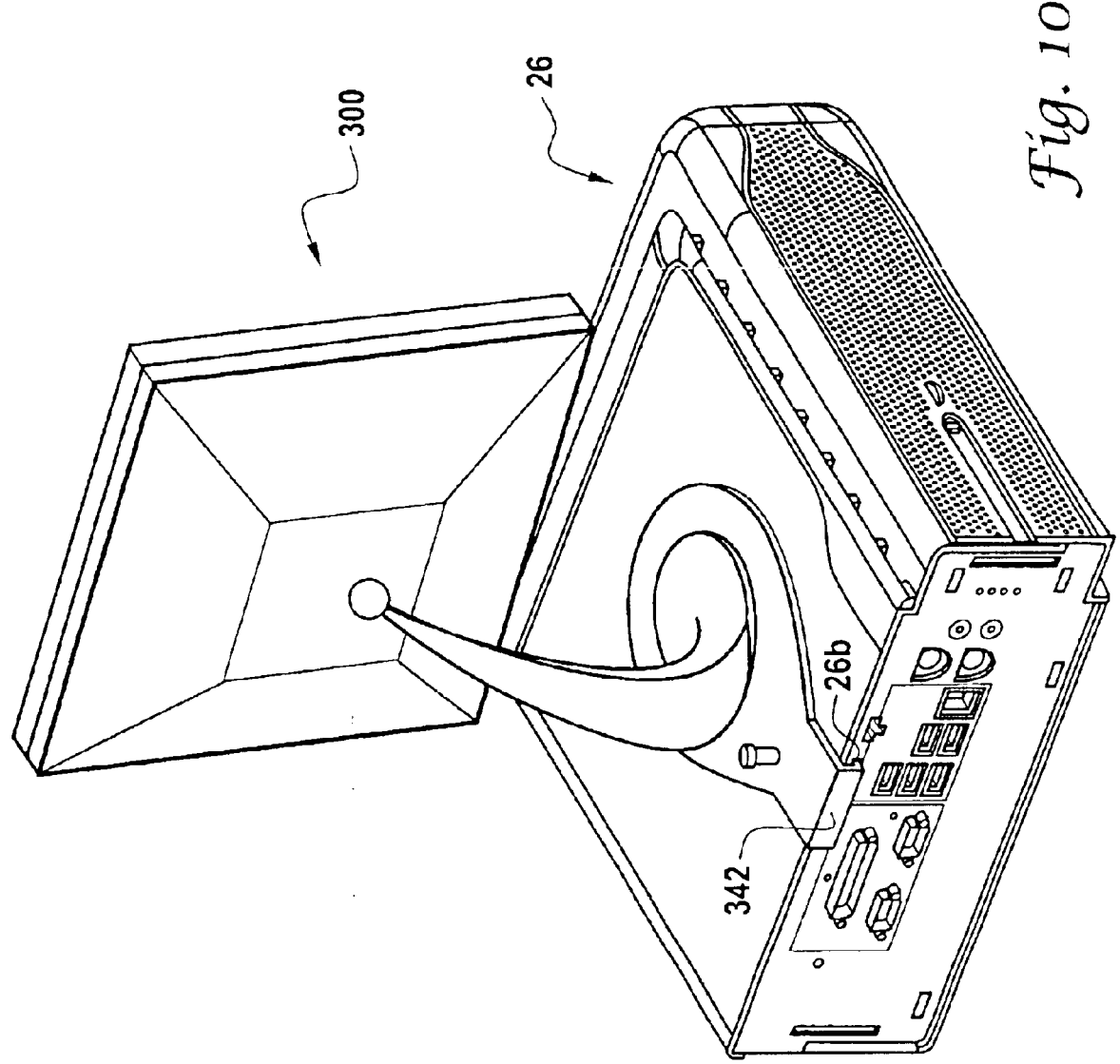

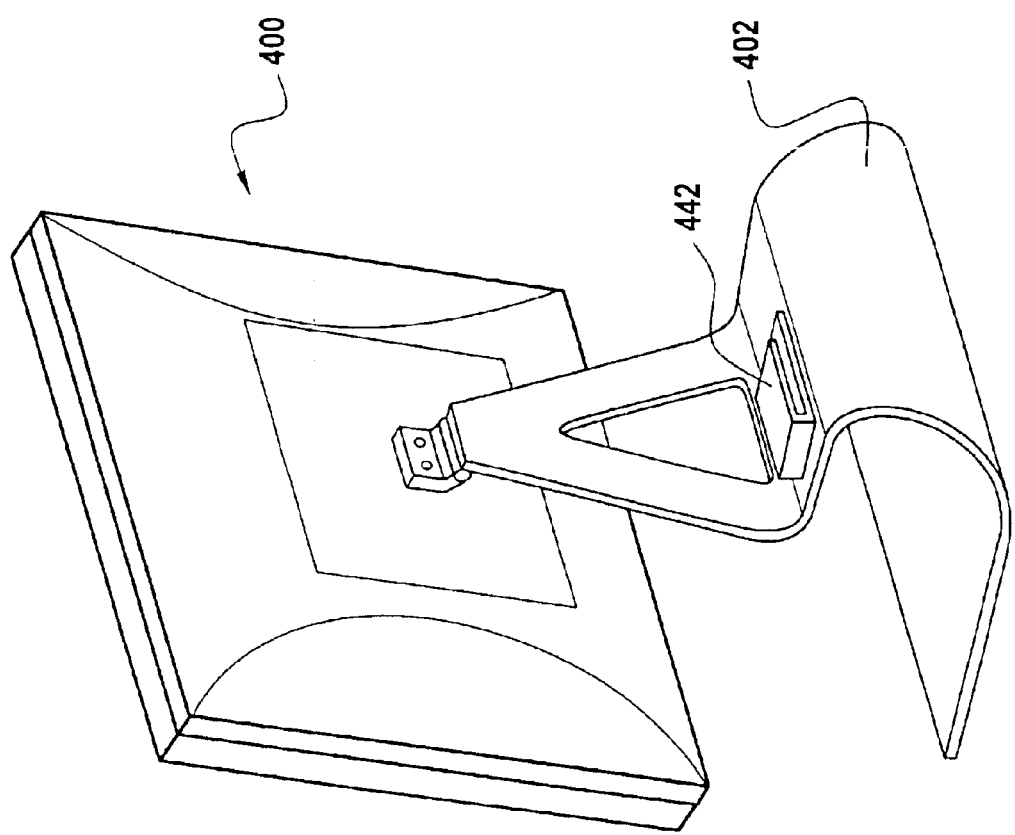

SECURED MOUNTING FOR COMPUTER AND PERIPHERALS

BACKGROUND

The present disclosure relates generally to information handling systems, and more particularly to a computer chassis integrated mounting and security system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most desktop computer chassis may be positioned in numerous orientations, including desk-mounted, floor-mounted and suspended. With the advent of ultra-small form factor (USFF) computers, new mounting approaches can be used.

There is a growing demand in the market for more space efficient, mechanically integrated "desktop" computer systems. These ultra small form factor (USFF) computers are ideally mountable for space savings, stability and security on desktop, wall and under-cabinet. Additionally, peripherals are ideally associated and co-located with the CPU, which when presented in USSF format does not have sufficient volume to mount the peripherals internally. Therefore, mounting of the chassis and peripherals becomes an inherent problem with the USSF size and also becomes a market opportunity if a successful mounting system is provided to accommodate both the mounting of the CPU to its location and the mounting of the peripherals in nearby location and association with the CPU. The mounting system must enable a standard mechanical attachment method of the computer chassis to a family of accessories. Mounting systems must be easily user configurable, internal to the chassis, and strong enough to support the chassis and peripheral devices in various orientations.

The combination of mounting the computer, adding peripherals and securing the computer in the mounted position may be integrated to provide convenience, access and security.

Therefore, what is needed is an apparatus for integrating a system whereby a computer and associated peripherals are operably mounted in a secured manner.

SUMMARY

One embodiment, accordingly, provides a computer including a chassis having a plurality of identical slots formed therein. Each slot is provided adjacent a respective one of a plurality of side surfaces of the chassis. An accessory includes an elongated tongue extending therefrom and insertable into a selected one of the slots of the chassis.

A principal advantage of this embodiment is that the computer chassis is secured in a selected mounting position which integrates convenience, access and security. Also, a choice of attachment is provided. A significant enhancement to security from theft is provided by the cover member being locked onto the chassis.

BRIEF DESCRIPTION OF THE DRAWINGS

FIG. 7 is a perspective view illustrating an embodiment of a computer chassis.

FIG. 8 is a perspective view illustrating an embodiment of a bracket for attachment to the chassis.

FIG. 9 is a perspective view illustrating an embodiment of a mounting bracket for a computer chassis.

FIG. 10 is a perspective view illustrating an embodiment of a touch screen mounted on a computer chassis.

FIGS. 11a and 11b are perspective views illustrating an embodiment of a stand for a computer chassis and a flat panel display.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
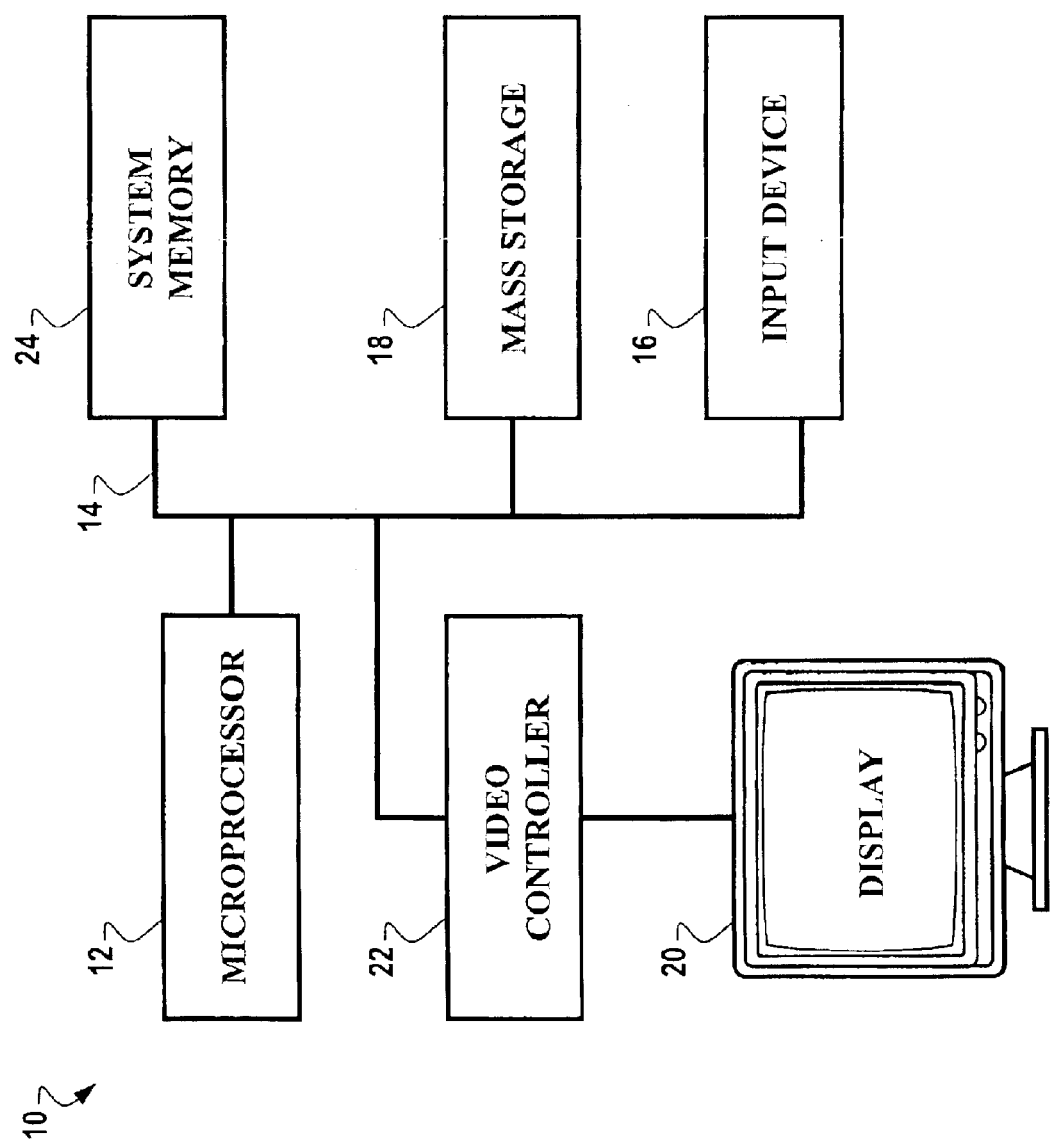
FIG. 1 is a diagrammatic view illustrating an embodiment of a computer system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
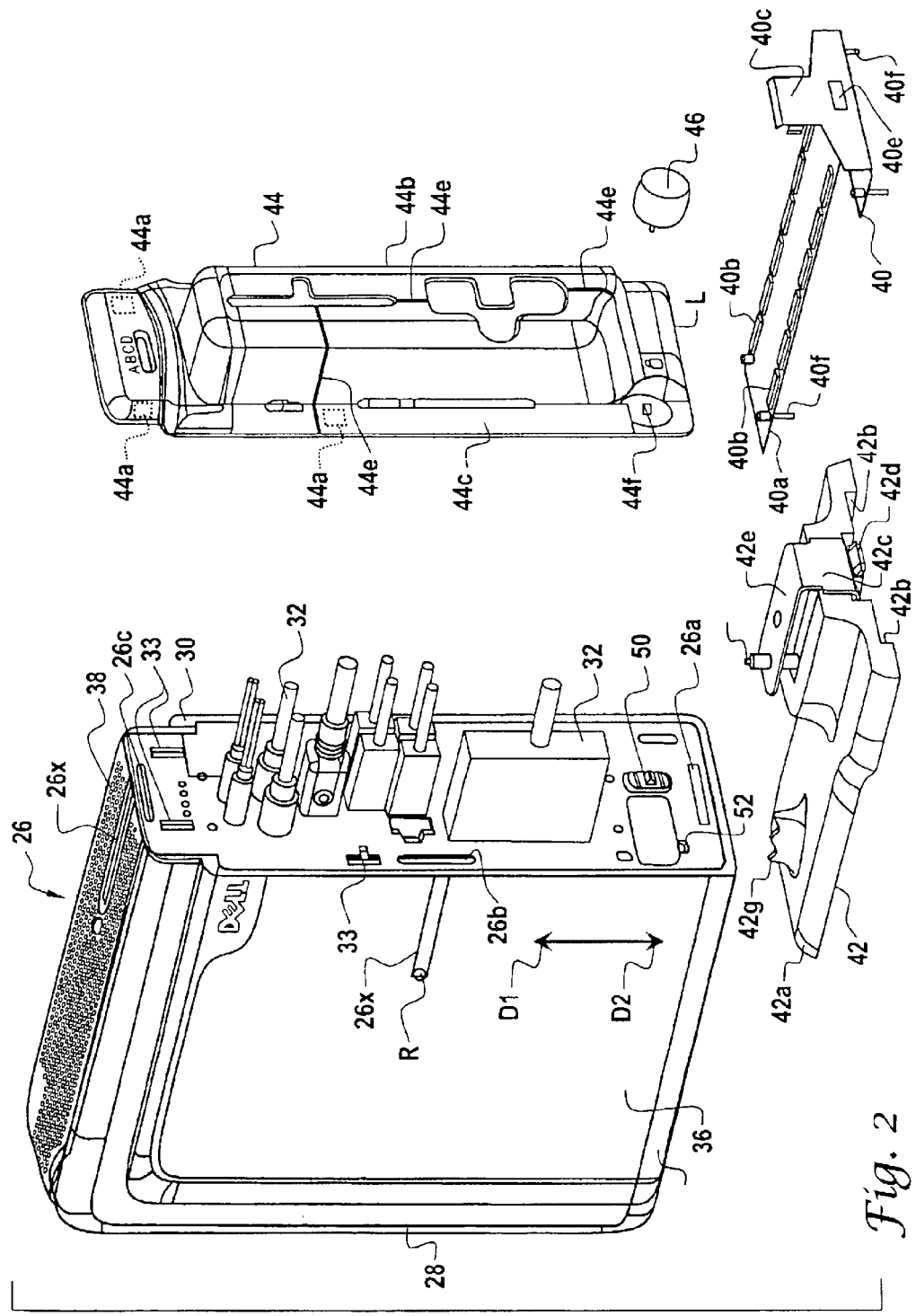
FIG. 2 is an exploded view illustrating an embodiment of a chassis security system.

An ultra-small form factor (USFF) computer chassis 26, FIG. 2, may contain all or most of the components of system 10 as described above. Chassis 26 includes a first end 28, a second end 30 having various cable connections 32 thereon, a first side 34 having a removable panel 36, and a second side 38, discussed later. Chassis 26 may be mounted and secured by means of a support surface bracket 40, a mounting member 42, and a security cover 44 which may be locked onto chassis 26 by a well-known Kensington lock 46, or other suitable lock.

Bracket 40 includes an elongated body 40a having a plurality of opposed tabs 40b. An end of body 40a includes a flange 40c and a slot 40e. Bracket 40 is attachable to a support surface, such as a desk or the like, by a plurality of fasteners 40f extending from body 40a.

Mounting member 42 includes an elongated body 42a and a pair of opposed guides 42b which extend along the length of body 42a for receiving tabs 40b of bracket 40. An end 42c of body 42a includes a flexible quick-release snap-tab 42d extending therefrom and an elongated tongue 42e. Also, a fastener 42f extends through body 42a. A foot 42g also extends from body 42a.

Figure 3:
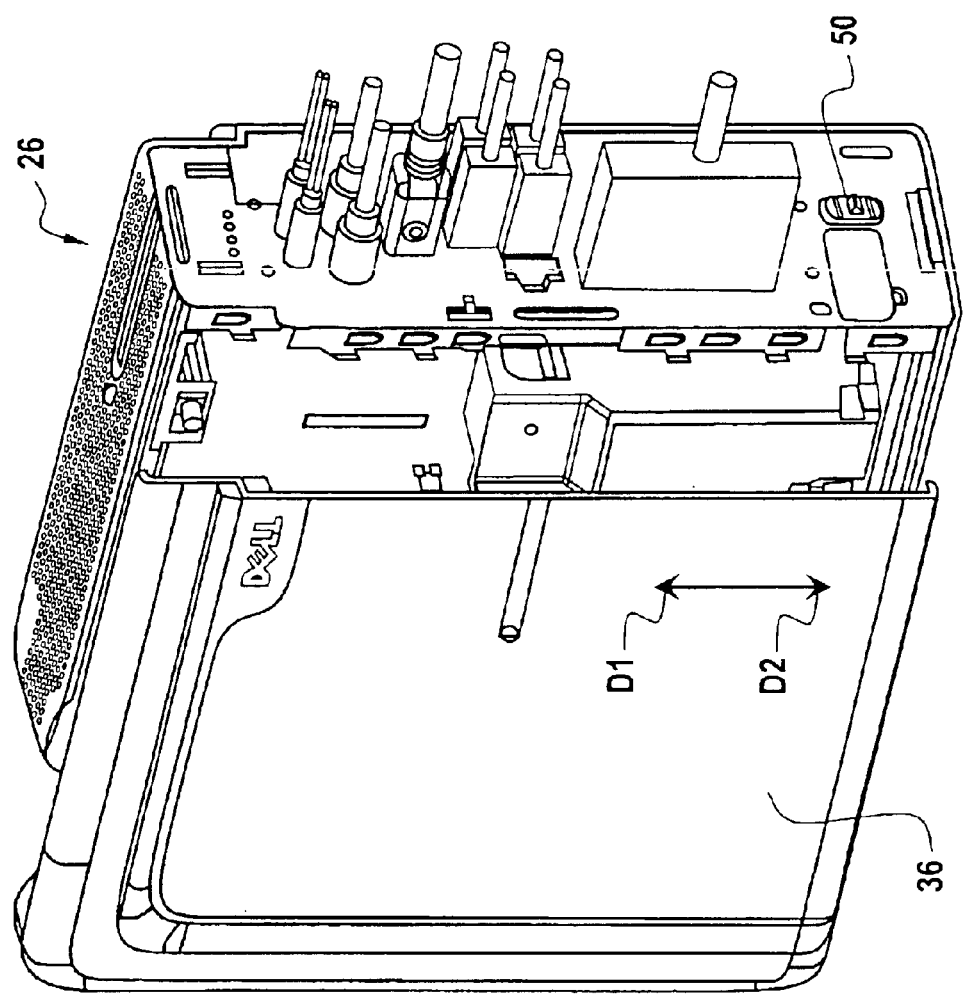
FIGS. 3, 4 and 5 are associated views of embodiments of the chassis.

Chassis 26 also includes a plurality of slots or mounting points 26a, 26b and 26c formed in second end 30 for selectively receiving key 42e. A bi-directional release latch 50 is also mounted on second end 30. Movement of latch 50 in a first direction D1, releases panel 36, to provide interior access to chassis 26, FIG. 3. Movement of latch 50 in a second direction D2 will be discussed later. In addition, again in FIG. 2, a receiver 52 is mounted in second end 30 for receiving the Kensington lock 46. An alignment slot 26x is provided adjacent each one of the mounting points 26a–26c, and a fastener receiver R is provided in each alignment slot.

The security cover 44 includes multiple feet 44a for engagement with respective slots 33 formed in second end 30. Cover 44 may be a molded synthetic one-piece member but is preferably a two-piece member including a first piece 44b and a second piece 44c separated by a seam 44e. The advantage of the two-piece member is that the two piece member allows the user to assemble all necessary cables, then enclose the cables with the two piece member. This order of assembly is an advantage over a single piece member. The Kensington lock 46 extends through an opening 44f in cover 44 and engages with the receiver 52 in second end 30.

Figure 4:
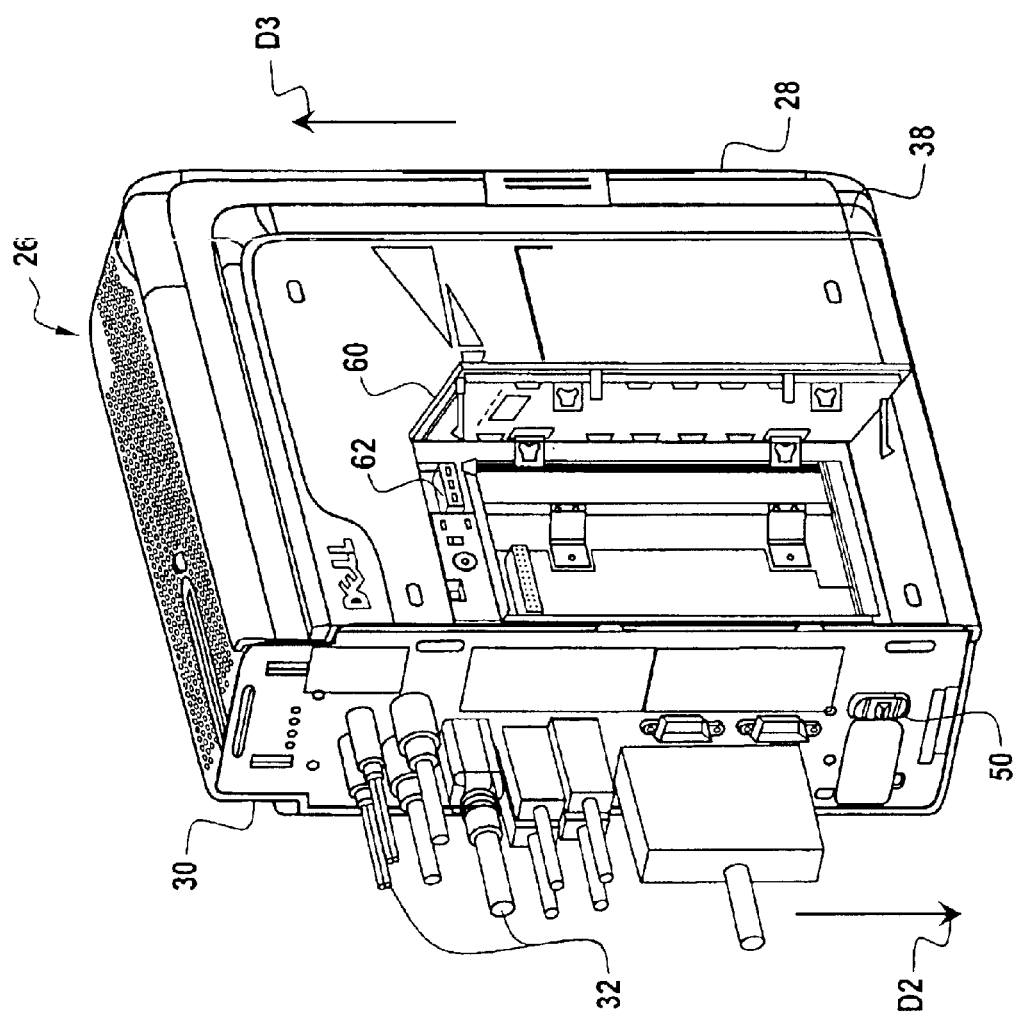
Figure 5:
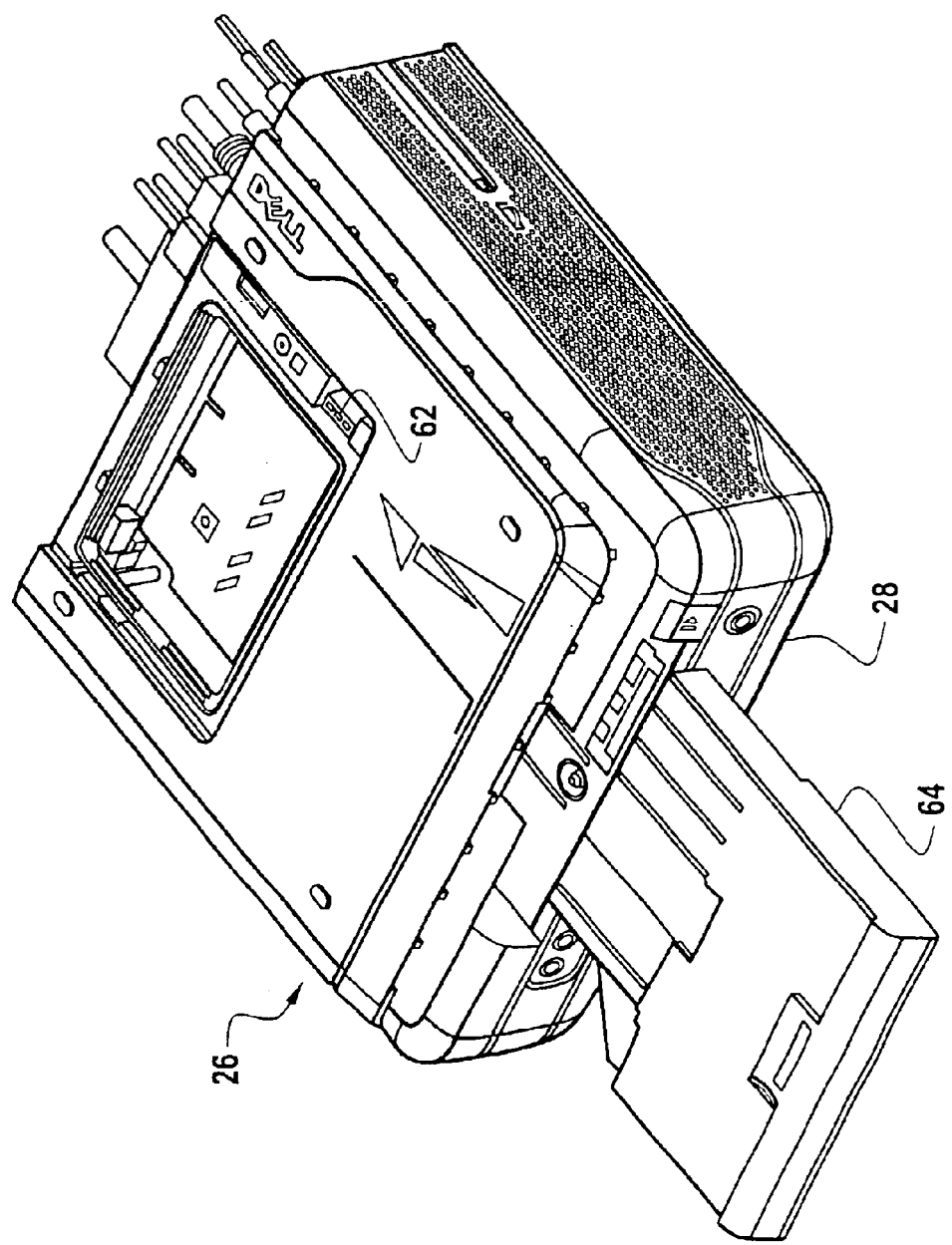

The second side 38, FIG. 4, illustrates another view of chassis 26 including a pivotable panel 60 for interior access to chassis 26. Panel 60 is released to open upon actuation of latch 50 in the second direction D2. Opening panel 60 exposes another release latch 62 which, upon movement in a direction D3, releases a door 64, which extends from first end 28 of chassis 26, FIG. 5, for containing a media storage device such as a floppy or a CD.

Figure 6:
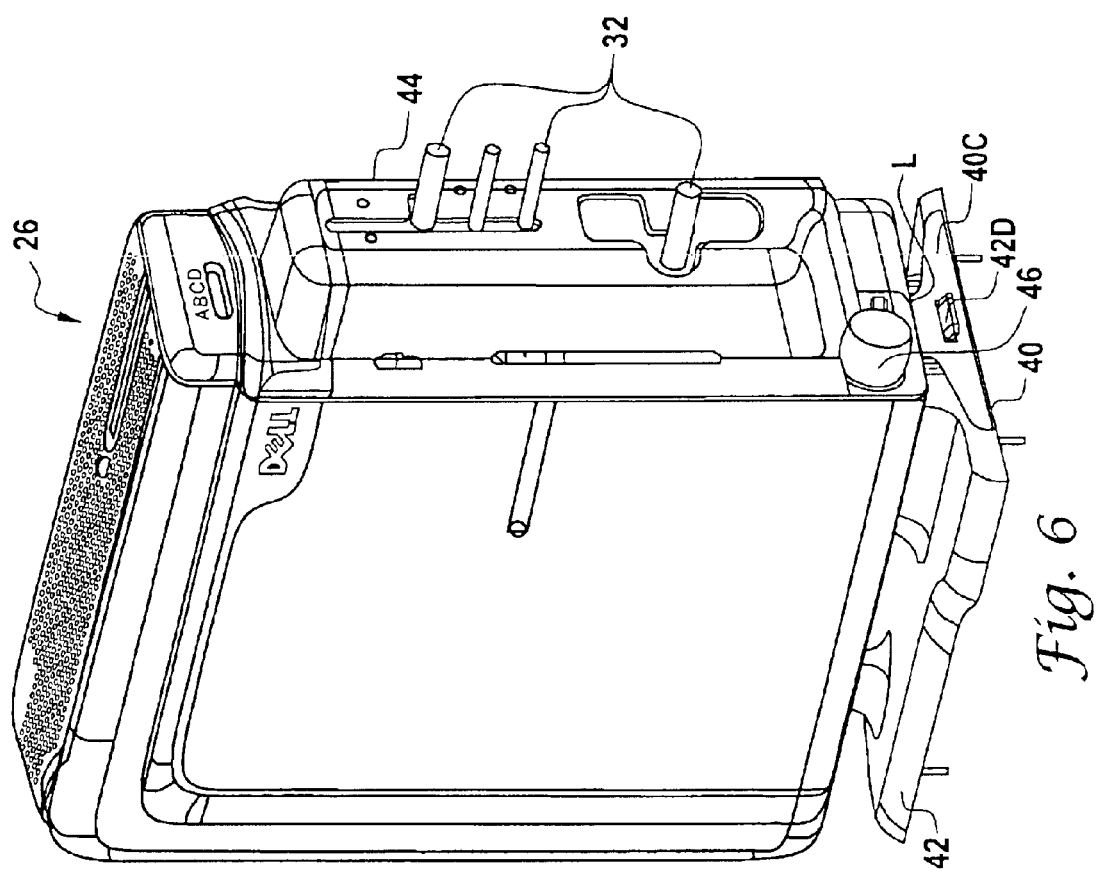
FIG. 6 is an assembled view illustrating an embodiment of the chassis security system.

In operation, reference being made to FIG. 2, bracket 40 is secured to a support surface (not shown) by means of fasteners 40f. Mounting member 42 is mounted on chassis 26 by sliding tongue 42e into a selected one of the mounting points 26a, 26b or 26c of chassis 26. The fastener 42f is fastened to the fastener receiver R formed adjacent each mounting point 26a, 26b and 26c. Chassis 26 is additionally supported due to contact with foot 42g. The mounting member 42 is mounted on bracket 40 by sliding engagement of tabs 40b in guides 42b, so that snap tab 42d extends through and snaps into engagement with slot 40e. Cover 44 is mounted on chassis 26 by inserting feet 44a in slots 33. Kensington lock 46 is inserted through opening 44f and secured in receiver 52. A bottom lip L of cover 44 extends over flange 40c of bracket 40 so that bracket 40 cannot move relative to mounting member 42, see FIG. 6. Cover 44 also covers all of the cable connections 32 connected to chassis 26 and also covers release latch 50.

Removal of cover 44 is permitted by first removing Kensington lock 46. This provides access to cable connections 32 and release latch 50. Flexure of snap tab 42d frees bracket 40 for relative movement with and separation from mounting member 42. Mounting member 42 can be removed from chassis 26 by release of fastener 42f.

In addition to securing the mounting member 42 to the chassis 26 by means of the tongue 42e being inserted into any one of the slots 26a, 26b or 26c, as described above, other peripherals and accessories may be attached to and secured to chassis 26 by means of tongue and slot arrangement.

A plurality of accessories and peripherals can be provided for attachment to chassis 26 with a mounting bracket 142, FIGS. 7 and 8, which includes a tongue 142e and a fastener 142f. Mounting bracket 142 may be of various configurations which include at least the tongue 142e and the fastener 142f. In this manner, any peripheral or accessory may include the tongue 142e for insertion into any one of the slots 26a, 26b or 26c, and the fastener 142f, if needed, may be secured to fastener receiver R which is positioned in each respective slot 26a, 26b and 26c. Also, the alignment guide 26x may be recessed into chassis 26 to locate an accessory and limit rotation during assembly. In some instances, a fastener 142f and an alignment guide 26x may not be required.

Figure 9A:
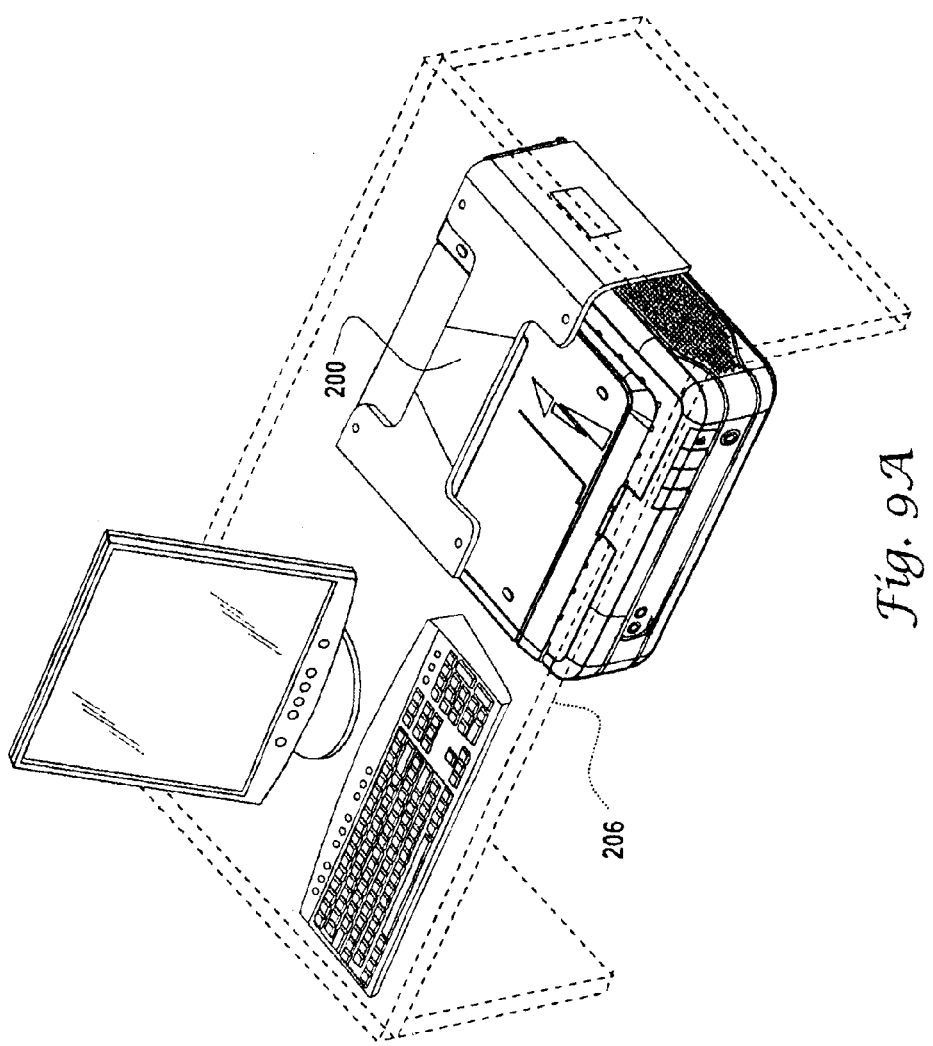
FIGS. 9a and 9b are views illustrating various mounting orientations of the bracket.
Figure 9B:
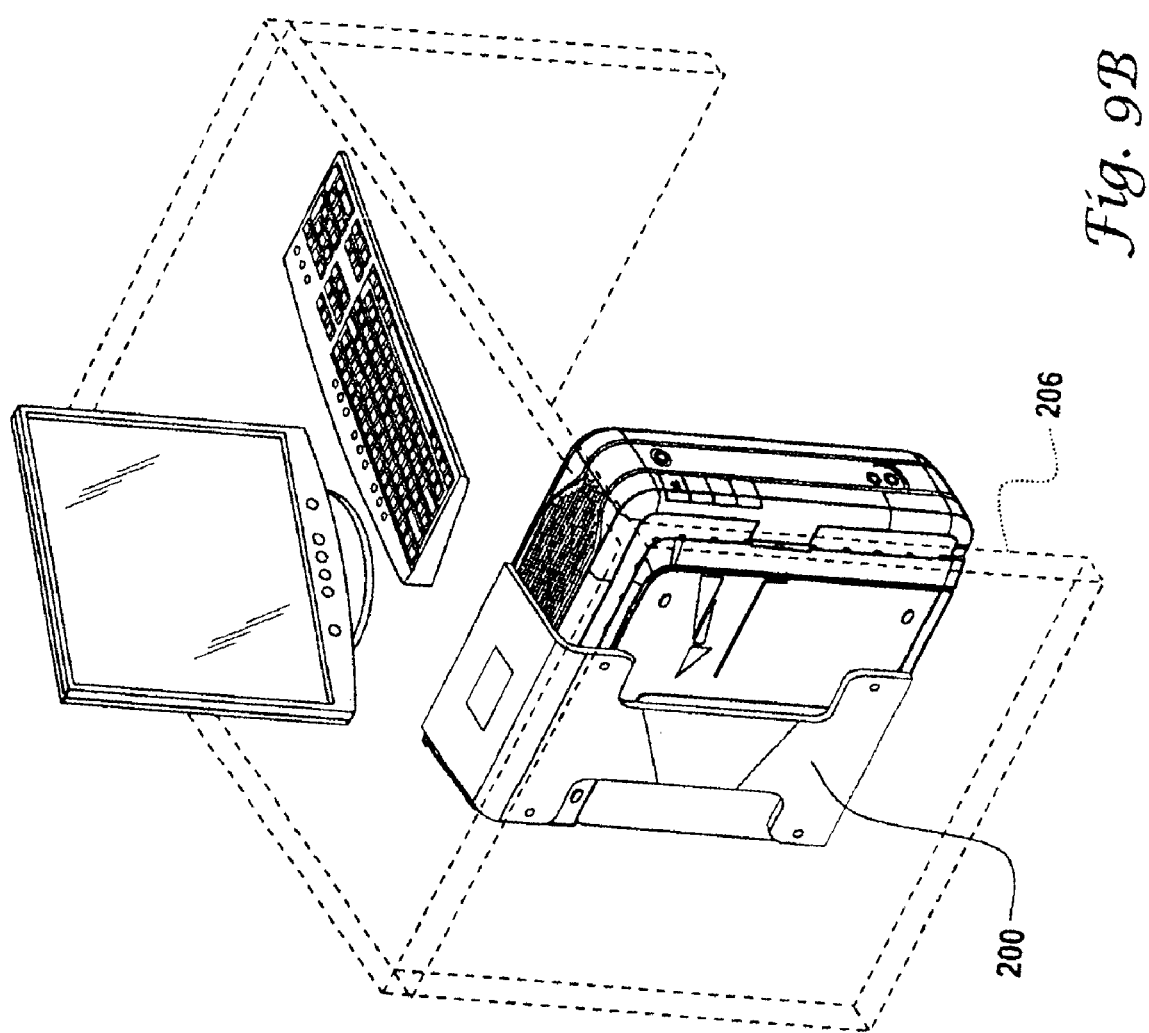

In one embodiment, FIG. 9, a mounting bracket 200 is provided with fastener receptacles 202 for receiving a plurality of common fasteners (not shown). A tongue 242 can be provided on one or more bracket arms 204. Thus, the bracket 200 can be mounted by the common fasteners to a support surface 206 in various orientations, FIGS. 9a and 9b, and the tongue 242, FIG. 9, can be received by one or more of the slots 26a or 26c, as described above.

In one embodiment, FIG. 10, a touch screen 300 can be attached to chassis 26 by means of tongue 342 being inserted into slot 26b, as discussed above.

Figure 11B:
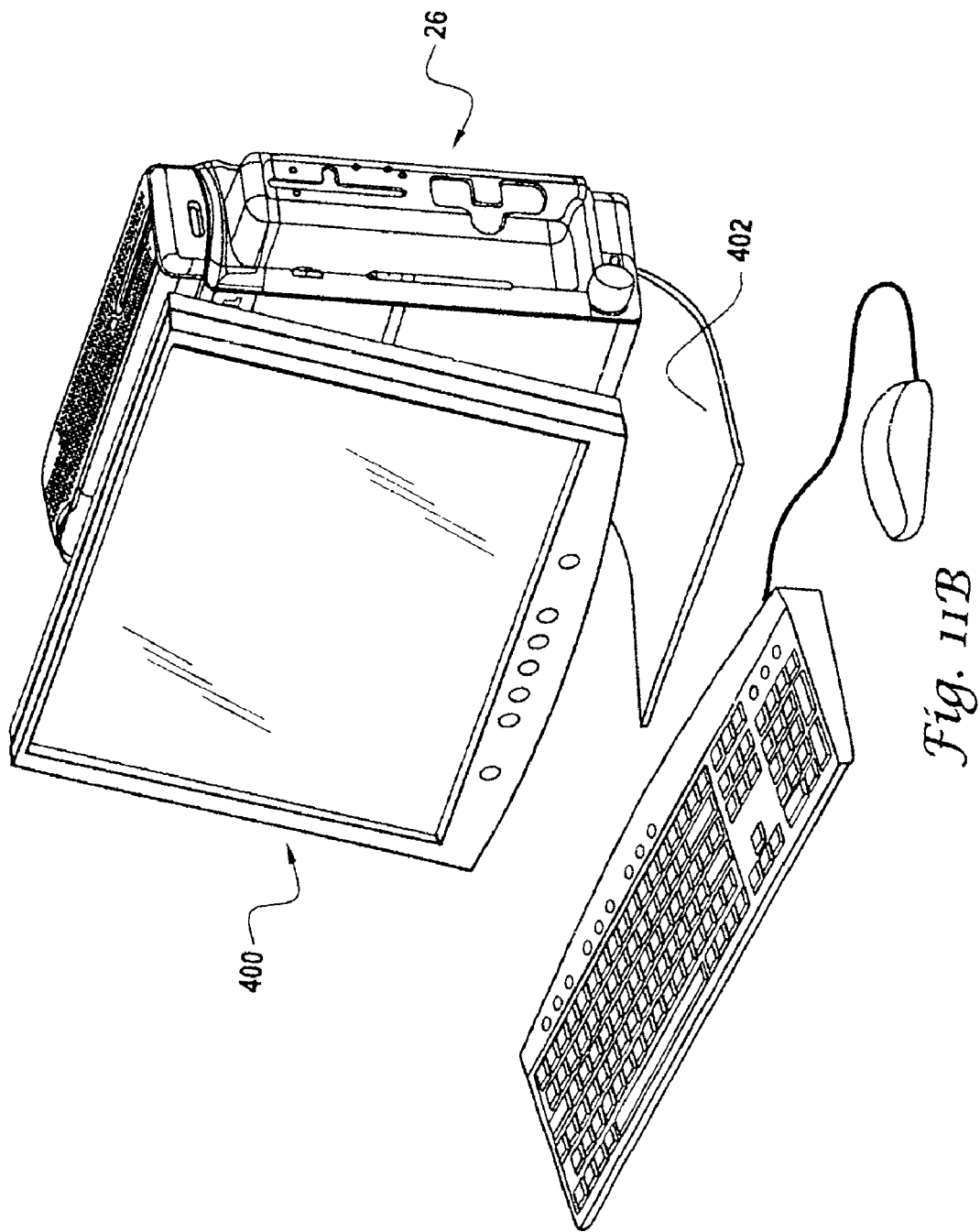

In one embodiment, FIGS. 11a and 11b, a flat panel display 400 can be mounted on a stand 402. A tongue 442 can be provided on stand 402 and received by one of the slots 26a or 26c for supporting chassis 26.

Figure 12A:
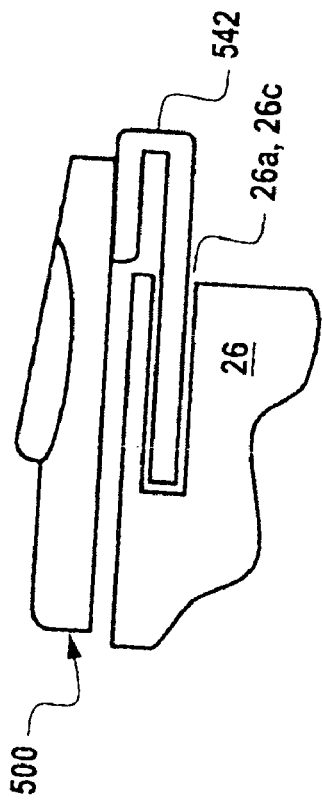
FIGS. 12a and 12b are views illustrating a peripheral device attached to a chassis.
Figure 12B:
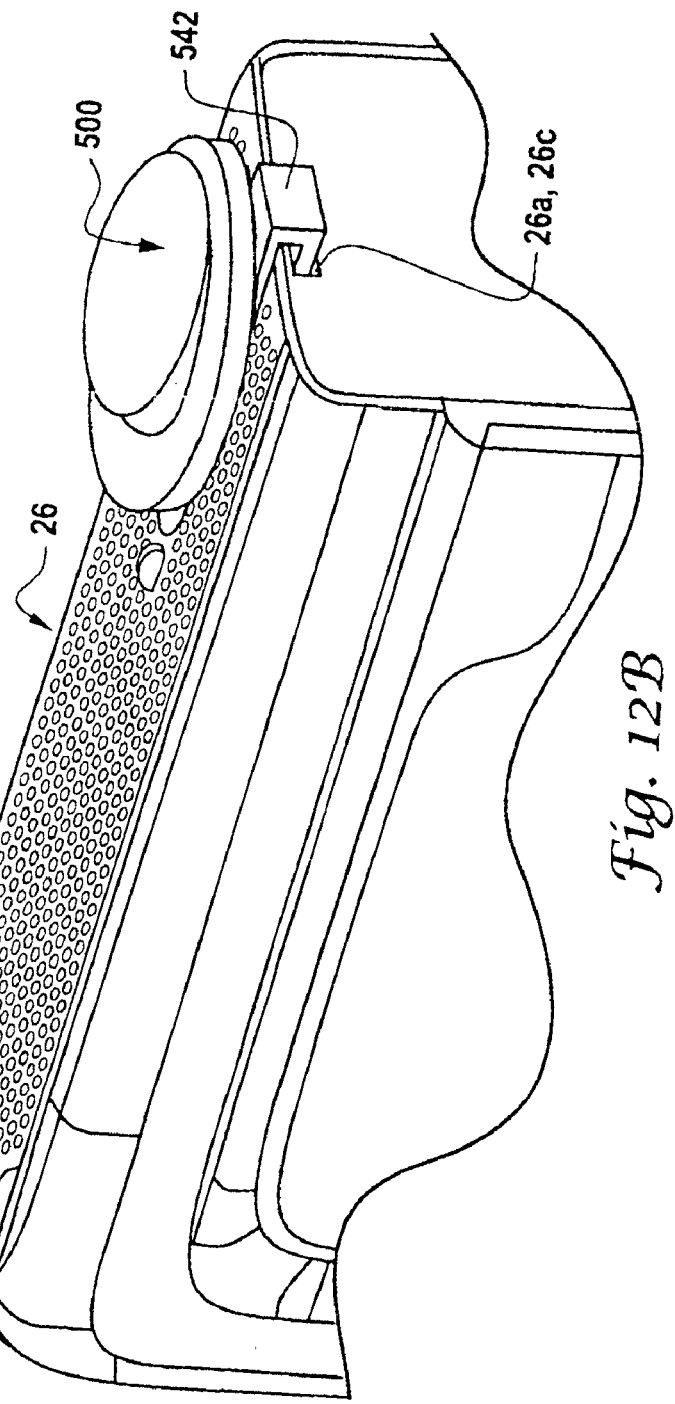

In one embodiment, FIGS. 12a and 12b, a peripheral device 500 for wireless USB networking can be mounted on chassis 26. Peripheral device 500 includes a tongue 542 for insertion into either of slots 26a or 26c as discussed above.

In operation, a plurality of slots in the computer chassis provide selective mounting points to receive a tongue attached to an accessory or peripheral such as a mounting bracket, a touch screen, a flat panel display and a mounting stand. The cover 44, mounted on chassis 26, secures the tongue in the respective slot and therefore secures any accessory or peripheral so engaged with the chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer comprising:
   a chassis including a plurality of identical slots formed therein, each slot being provided adjacent a respective one of a plurality of side surfaces of the chassis, whereby each slot is operable to:
   (a) accept a peripheral device including an accessory having an elongated tongue extending therefrom and insertable into a selected one of the slots on the chassis, whereby the peripheral device is mounted to the chassis in one of a plurality of orientations; and
   (b) mount the chassis to the accessory having an elongated tongue extending therefrom and insertable into a selected one of the slots on the chassis, the accessory being on a support surface, whereby the chassis is mounted on the support surface in one of a plurality of orientations.

2. The computer as defined in claim 1 further comprising: a fastener mounted on the accessory.

3. The computer as defined in claim 2 further comprising: a receiver provided in the chassis for receiving the fastener.

4. The computer as defined in claim 1 further comprising: an alignment guide provided in the chassis.

5. The computer as defined in claim 4 wherein the alignment guide is adjacent at least one of the slots and a fastener receiver is provided in the alignment guide.

6. The computer as defined in claim 1 wherein the accessory is a mounting bracket.

7. The computer as defined in claim 6 wherein the mounting bracket includes fastener apertures.

8. The computer as defined in claim 6 wherein the mounting bracket includes at least one bracket arm for supporting the elongated tongue.

9. The computer as defined in claim 1 wherein the peripheral device is a touch screen.

10. The computer as defined in claim 1 wherein the accessory is a stand for supporting a flat panel display.

11. The computer as defined in claim 1 wherein the peripheral device is for wireless USB networking.

12. An information handling system comprising:
   a chassis including a plurality of identical slots formed therein, each slot being provided adjacent a respective one of a plurality of side surfaces of the chassis, whereby the slots are operable to:
   (a) mount an information handling system peripheral device to the chassis, the information handling system peripheral device including an accessory having an elongated tongue extending therefrom and insertable into a selected one of the slots on the chassis, whereby the peripheral device is mounted on the chassis in one of a plurality of selected orientations; and
   (b) mount the chassis to a support surface, the support surface including the accessory having an elongated tongue extending therefrom and insertable into a selected one of the slots on the chassis, whereby the chassis is mounted on the support surface in one of a plurality of selected orientations;
   a microprocessor mounted in the chassis; and
   a storage coupled to the microprocessor.

13. The system as defined in claim 12 further comprising: a fastener mounted on the accessory.

14. The system as defined in claim 13 further comprising: a fastener receiver provided in the chassis.

15. The system as defined in claim 12 further comprising: an alignment guide provided in the chassis.

16. The system as defined in claim 15 wherein the alignment guide is adjacent at least one of the slots.

17. The system as defined in claim 12 wherein the accessory is a mounting bracket.

18. The system as defined in claim 17 wherein the mounting bracket includes fastener apertures.

19. The system as defined in claim 17 wherein the mounting bracket includes at least one bracket arm for supporting the elongated tongue.

20. The system as defined in claim 12 wherein the information handling system peripheral device is a touch screen.

21. The system as defined in claim 12 wherein the accessory is a stand for supporting a flat panel display.

22. The system as defined in claim 12 wherein the information handling system peripheral device is for wireless USB networking.

23. A method of mounting a computer chassis comprising:
   providing a computer chassis having a plurality of identical slots formed therein, each slot being adjacent a respective one of a plurality of side surfaces of the chassis;
   providing one of:
   (a) a peripheral device including an accessory having an elongated tongue extending therefrom and insertable into a selected on of the slots on the chassis, whereby the peripheral device is mountable to the chassis in one of a plurality of orientations; and
   (b) a support surface including the accessory having an elongated tongue extending therefrom and insertable into a selected one of the slots on the chassis, whereby the chassis is mountable on the support surface in one of a plurality of orientations; and
   selecting the mounting of one of the peripheral device to the chassis and the chassis to the support surface by inserting the tongue into a selected one of the slots of the chassis.

24. An information handling system comprising:
   a chassis;
   a microprocessor mounted in the chassis;
   a storage coupled to the microprocessor;
   the chassis including a plurality of slots formed therein, whereby the slots are operable to:
   (a) accept a peripheral device including an accessory having an elongated tongue extending therefrom and insertable into a selected one of the slots on the chassis, whereby the peripheral device is mounted to the chassis in one of a plurality of selected orientations; and
   (b) mount the chassis to the accessory having an elongated tongue extending therefrom and insertable into a selected one of the slots on the chassis, the accessory being on a support surface, whereby the chassis is mounted on the support surface in one of a plurality of selected orientations; and a cover mounted on the chassis for securing an accessory mounted in any one of the slots.

25. The system as defined in claim 24 further comprising:
a fastener mounted on the accessory.

26. The system as defined in claim 25 further comprising:
a fastener receiver provided in the chassis.

27. The system as defined in claim 24 further comprising:
an alignment guide provided in the chassis.

28. The system as defined in claim 27 wherein the alignment guide is adjacent at least one of the slots.

29. The system as defined in claim 24 wherein the accessory is a mounting bracket.

30. The system as defined in claim 29 wherein the mounting bracket includes fastener apertures.

31. The system as defined in claim 29 wherein the mounting bracket includes at least one bracket arm for supporting the elongated tongue.

32. The system as defined in claim 24 wherein the peripheral device is a touch screen.

33. The system as defined in claim 24 wherein the accessory is a stand for supporting a flat panel display.

34. The system as defined in claim 24 wherein the peripheral device is for wireless USB networking.

* * * * *

UNITED STATES PATENT AND TRADEMARK OFFICE
CERTIFICATE OF CORRECTION

PATENT NO. : 6,917,519 B2
DATED : July 12, 2005
INVENTOR(S) : Coyle et al.

It is certified that error appears in the above-identified patent and that said Letters Patent is hereby corrected as shown below:

Column 6,
Line 40, delete "selected on" and insert -- selected one --.

Signed and Sealed this

Eleventh Day of October, 2005

JON W. DUDAS
*Director of the United States Patent and Trademark Office*